Figures 1, 2:
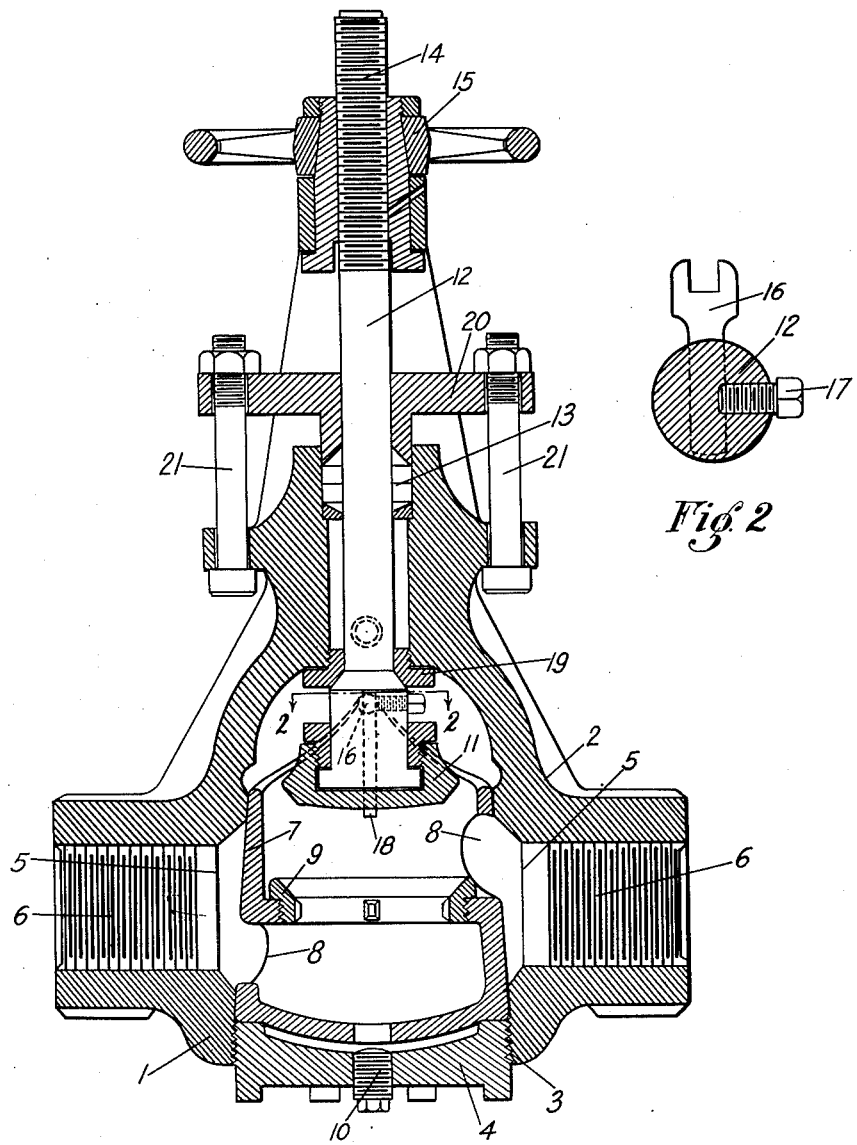

Sept. 29, 1931.  H. B. REDDING  1,825,543
VALVE FOR HIGH PRESSURE AND HIGH TEMPERATURE PURPOSES
Filed April 5, 1927

Harry B. Redding
INVENTOR.

BY
ATTORNEY.

Patented Sept. 29, 1931

1,825,543

UNITED STATES PATENT OFFICE

HARRY B. REDDING, OF COLUMBUS, OHIO, ASSIGNOR TO THE VALVE EQUIPMENT COMPANY, OF COLUMBUS, OHIO, A CORPORATION OF OHIO

VALVE FOR HIGH PRESSURE AND HIGH TEMPERATURE PURPOSES

Application filed April 5, 1927. Serial No. 181,183.

My invention relates to valves for high pressure and high temperature purposes and has to do with a valve structure wherein the body or casing is constructed in a single piece. It also has to do with the provision of a valve having structural characteristics ensuring the elimination of disadvantages, such as leakage, or warpage, and facilitating the removal of the internal parts of the valve.

Heretofore, it has been customary to construct a valve body in two pieces, namely, that part having the fluid passages therethrough and a bonnet or covering. The bonnet or covering supported the valve stem and the actuating means for the stem. Where exceedingly high pressures are used, this valve has had the disadvantage of "blowing out" at the joint where the two parts of the valve body meet, causing delay while the necessary repairs are being made. Previous valves have also required a large amount of clearance space, due to the stem actuating means being attached to and rotating with the stem. With the actuating means attached in this manner, the stem is subject to bending, preventing a good seat on the packing in the bonnet.

Furthermore, where high temperatures are used, the valves are usually covered, on the outside, with asbestos which acts as an insulator against heat. With the valves as generally constructed and covered, it is a considerable task to remove the inner parts of the valve for repairs or adjustments, since it necessitates removing a greater part of the asbestos covering before access can be obtained to the inner parts of the valve.

One object of my invention is to provide a valve wherein the body is in one piece and to provide a means facilitating the removal of the inner parts of the valve.

Another object of my invention is to provide a valve wherein a minimum space or clearance is required for the valve stem and where the alignment of the stem is practically assured.

Still another object of my invention is to provide a valve wherein the flange connection between the body of the valve and the bonnet or any part of the bonnet is eliminated.

Other and further objects of my invention will appear in the following description and the preferred embodiment of my invention will be seen in the accompanying drawings wherein similar characters of references designate corresponding parts and wherein Figure 1 is a vertical longitudinal cross-section of a valve constructed in accordance with the idea disclosed by my invention.

Figure 2 is a top plan view, partly in section, taken on the line 2—2 of Figure 1.

With reference to Figure 1 of the drawings, I have shown a valve constructed in accordance with the ideas disclosed by my invention comprising a casing 1. This casing is, preferably, made of some metal that possesses a maximum mechanical strength and, at the same time, is devoid of bulkiness or excessive weight. The casing 1 is formed to include a centrally disposed valve chamber 2 possessing its smallest diameter at the upper end of the casing and its greatest diameter at the lower or threaded open end 3 of the casing. The extreme lower end of the casing terminates in the threaded open end 3 which is adapted to receive a nut 4. Also, the casing 1 is provided with longitudinally extending axially arranged fluid passages, which communicate with the pipe attaching ends 6 thereof.

Mounted within the chamber 2, is a valve cage 7. This valve cage 7, preferably, includes an integral hollow body formed of some inert metal that is impervious to the destructive action of acidic or alkaline fluids and that will readily lend itself to match operations. The valve cage 7 is of tapering form in order to correspond to and fit snugly in the valve chamber 2 and, as shown, is provided with ports 8 which register with the fluid passages 5 of the valve casing. As shown in Figure 1, the cage is provided with a removable valve seat 9.

The lower end of the valve cage rests upon the upper side of the nut 4 which has the drain plug 10 therein and which fits into the threaded open end 3 of the chamber 2. By means of this nut, the cage may be forced into a tight wedging relation with the chamber 2 and be held securely therein. It will be obvious, by referring to Figure 1 of the drawings, that the cage is so constructed with relation to the valve chamber that it will possess a certain amount of end play, allowing the cage to be adjusted in either direction as it varies in size, due to expansion and contraction or the wearing away of the walls of the valve cage and the valve chamber 2. Thus, a tight fluid seal may always be maintained between the walls of the valve cage 7 and the valve chamber 2 by the action of the nut 4 forcing the cage into a wedging relation with such chamber.

By removing the nut 4 in the bottom of the valve chamber, the cage 7 may be removed bodily from the casing 1, permitting the valve seat 9 to be redressed or removed without, in any way, disturbing the position of the valve casing in its relation to the fluid line. Removal of the cage may be easily accomplished by placing the seating surface of the valve body 11 against the seating surface of the valve seat 9 and exerting continuous pressure on the valve body by the rotation of the manipulating wheel.

It will be understood readily that, by the inclusion of the valve cage 7 and the valve seat 9 mounted therein, the process or problem of manufacturing the casings is materially simplified, since the operation of valve seating is confined to the structure of the cage and the valve cage may be readily fashioned or machined to produce the desired shapes or contours. Also, such construction makes it possible to use the same valve for either a "globe" or a "gate" valve, since the only change necessary would be in the removable valve cage and the detachable valve head.

In Figure 1, the closure means comprises what is known as the "globe" type of valve closure, although many different types of closure means may be provided without departing from the spirit of my invention. For instance, a cage adapted to a "gate" type valve closure might easily be substituted for the cage shown in Figure 1, the central chamber 2 being constructed to receive either type of cage. The valve, as shown, consists of a globe head 11 carried by a stem 12 which passes through the packing 13 provided in connection with the upper part of the valve casing. The upper end of the stem 12 is threaded as at 14 for cooperation with a threaded nut 15 carrying a hand wheel which is stationary as regards vertical movement.

In a valve of the "globe" type, shown in Figure 1 of the drawings, it is desirable to have the valve head so constructed that it will rotate idly on the stem, assuming a different position on the valve seat each time the valve is closed. Furthermore, I have found it desirable to ensure alignment of the valve stem 1, in order to minimize leakage and for other advantages, to provide a non-rotatable valve stem operated by a wheel which forms a part of the casing of the valve.

The stem is prevented from rotating by a yoke 16, the shank of which extends into a socket in the valve stem and is held therein by a set-screw 17. The yoke 16 engages and slides along the guide strip 18 carried by the valve cage 7. It is necessary to have the guiding means in conjunction with the stem, rather than with the valve head, otherwise, the valve head would not rotate. Locking of the stem to prevent rotation has the advantage of causing the stem to maintain the same seat in the packing around the stem and also permits the stem to be used as a gauge for determining the position of the valve body with respect to its seat.

An additional feature of construction in a valve of this type lies in the fact that the bushing 19 is inserted, as shown in Figure 1, so that pressure on the lower face of the bushing will tend to hold it firmly in its proper position. The bushing 19 being inserted in this manner, provides a means whereby the packing 13 may be renewed while the valve is working under full pressure. The packing 13, in the upper part of the valve casing, is held securely in position by the guard 20 which is adjustable, as regards pressure on the packing 13, by the bolts 21.

It will be clearly understood, by referring to the previous description and the drawings attached hereto, that I have provided a valve having a one-piece body and have provided means facilitating the removal of the inner parts of the valve. This last has been accomplished in the manner set forth in the description, since it is easily seen that the removal of a small section of the asbestos covering, provided there is such covering, on the valve and the nut in the lower end of the casing would be a comparatively simple operation.

It will also be clearly understood that I have provided a valve seat wherein a minimum space or clearance is required for the valve stem, since the manipulating wheel is stationary and only the stem moves longitudinally. The idea of the stationary manipulating wheel is especially desirable since it relieves the stem of the stress or strain to which it was subjected, when the manipulating wheel was attached thereto and rotated therewith, thus practically assuring the alignment of the stem.

Having thus described my invention, what I claim is:

1. A valve comprising a casing having an integral bonnet and provided with inlet and outlet passageways in opposite sides thereof, a well within the casing between said passageways and having a vertically disposed frusto-conical inner surface, a cage in the well having a frusto-conical outer surface engaging the complementary surface of the well above and below said passageways and having upper and lower ports at opposite sides thereof, a valve seat in the cage between said ports, the bottom of the casing having an opening therein, a plug closing said opening and forcing the cage into snug engagement with the inner surface of the well, a valve stem having an unthreaded portion extending through an opening in the top of the bonnet, and a valve head connected to the lower end of the stem and engageable with said seat, said cage, seat, valve head and stem being removable through the opening in the bottom of the casing when the plug is detached from the latter.

2. A valve comprising a casing having an integral bonnet and provided with inlet and outlet passageways in opposite sides thereof, a well within the casing between said passageways and having a vertically disposed frusto-conical inner surface, a cage in the well having a frusto-conical outer surface engaging the complementary surface of the well and having upper and lower ports at opposite sides thereof, a valve seat in the cage between said ports, the bottom of the casing having an opening therein, a plug closing said opening and forcing the cage into snug engagement with the inner surface of the well, a valve stem having an unthreaded portion extending through an opening in the top of the bonnet, a valve head connected to the lower end of the stem and engageable with said seat, said cage, seat, valve head and stem being removable through the opening in the bottom of the casing when the plug is detached from the latter, and a ring surrounding the stem and extending into the opening of the bonnet, said ring and stem having complementary frusto-conical surfaces for preventing leakage of fluid through the opening in the bonnet while the stem is being repacked.

3. A valve comprising a casing having an integral bonnet and provided with inlet and outlet passageways in opposite sides thereof, a well within the casing between said passageways and having a vertically disposed frusto-conical inner surface, a cage in the well having a frusto-conical outer surface engaging the complementary surface of the well and having upper and lower ports at opposite sides thereof, a valve seat in the cage between said ports, the bottom of the casing having an opening therein, a plug closing said opening and forcing the cage into snug engagement with the inner surface of the well, a valve stem having an unthreaded portion extending through an opening in the top of the bonnet, a valve head connected to the lower end of the stem and engageable with said seat, said cage, seat, valve head and stem being removable through the opening in the bottom of the casing when the plug is detached from the latter, the head being swiveled on the stem, and means within the well for preventing rotation of the stem as the latter is moved axially.

4. A valve comprising a casing having an integral bonnet and provided with inlet and outlet passageways in opposite sides thereof, a well within the casing between said passageways and having a vertically disposed frusto-conical inner surface, a cage in the well having a frusto-conical outer surface engaging the complementary surface of the well and having upper and lower ports at opposite sides thereof, a valve seat in the cage between said ports, the bottom of the casing having an opening therein, a plug closing said opening and forcing the cage into snug engagement with the inner surface of the well, a valve stem having an unthreaded portion extending through an opening in the top of the bonnet, a valve head connected to the lower end of the stem and engageable with said seat, said cage, seat, valve head and stem being removable through the opening in the bottom of the casing when the plug is detached from the latter, a guide track on the cage arranged parallel to the stem, and a guide member on the stem engaging said track.

5. A valve comprising a casing having an integral bonnet and provided with inlet and outlet passageways in opposite sides thereof, a well within the casing between said passageways and having a vertically disposed frusto-conical inner surface, a cage in the well having a frusto-conical outer surface engaging the complementary surface of the well and having upper and lower ports at opposite sides thereof, a valve seat in the cage between said ports, the bottom of the casing having an opening therein, a plug closing said opening and forcing the cage into snug engagement with the inner surface of the well, a valve stem having an unthreaded portion extending through an opening in the top of the bonnet, a valve head connected to the lower end of the stem and engageable with said seat, said cage, seat, valve head and stem being removable through the opening in the bottom of the casing when the plug is detached from the latter, said valve head being swiveled to the stem, means in the well in close proximity to the valve seat for preventing rotation of the stem, the external portion of the stem having threads, a nut engaging said threads, means for preventing movement of the nut axially of the stem, and means for rotating said nut.

6. A valve comprising a casing having an integral bonnet and provided with inlet and outlet passageways in opposite sides thereof, a well within the casing between said passageways and having a vertically disposed frusto-conical inner surface, a cage in the well having a frusto-conical outer surface engaging the complementary surface of the well and having upper and lower ports at opposite sides thereof, a valve seat in the cage between said ports, the bottom of the casing having an opening therein, a plug closing said opening and forcing the cage into snug engagement with the inner surface of the well, a valve stem having an unthreaded portion extending through an opening in the top of the bonnet, and a valve head connected to the lower end of the stem and engageable with said seat, said cage, seat, valve head and stem being removable through the opening in the bottom of the casing when the plug is detached from the latter, the bottom of the cage having an opening therein, whereby fluid pressure within the casing will be equalized on both sides of the bottom of the cage.

In testimony whereof I, hereby, affix my signature.

HARRY B. REDDING.